United States Patent
Wang et al.

(10) Patent No.: US 11,435,581 B2
(45) Date of Patent: Sep. 6, 2022

(54) VEHICLE-MOUNTED DISPLAY DEVICE AND DISPLAY SYSTEM

(71) Applicant: BOE TECHNOLOGY GROUP CO., LTD., Beijing (CN)

(72) Inventors: Xin Wang, Beijing (CN); Fan Yang, Beijing (CN); Jianhua Du, Beijing (CN); Lei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 16/652,631

(22) PCT Filed: Mar. 28, 2019

(86) PCT No.: PCT/CN2019/080117
§ 371 (c)(1),
(2) Date: Mar. 31, 2020

(87) PCT Pub. No.: WO2019/184984
PCT Pub. Date: Oct. 3, 2019

(65) Prior Publication Data
US 2020/0241293 A1    Jul. 30, 2020

(30) Foreign Application Priority Data
Mar. 3, 2018 (CN) .......................... 201810295574.4

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *G02B 27/0149* (2013.01);
(Continued)

(58) Field of Classification Search
CPC ....... G02B 27/01–0189; G02B 2027/01–0198; B60K 35/00
See application file for complete search history.

(56) References Cited

U.S. PATENT DOCUMENTS 6,342,871 B1 * 1/2002 Takeyama .......... G02B 17/0832
345/7
10,120,189 B2   11/2018 Saito et al.
(Continued)

FOREIGN PATENT DOCUMENTS

CN    105564330 A    5/2016
CN    205333968 U    6/2016
(Continued)

OTHER PUBLICATIONS

The First Chinese Office Action dated May 7, 2019; Appln. No. 201810295574.4.

*Primary Examiner* — Michelle M Iacoletti
*Assistant Examiner* — Christopher A Lamb, II

(57) ABSTRACT

Provided are a vehicle-mounted display device and a display system. The vehicle-mounted display device includes: an image source, a light reflection module, and an image size adjustment module which are located on a light path; wherein the image source is configured to emit image light to the light reflection module according to an image to be displayed; the light reflection module reflects the image light at least twice, and emits same to the image size adjustment module; and the image size adjustment module is configured to adjust and emit the image light incident thereon.

17 Claims, 6 Drawing Sheets

(52) U.S. Cl.
CPC *B60K 2370/1529* (2019.05); *B60K 2370/176* (2019.05); *B60K 2370/21* (2019.05); *B60K 2370/52* (2019.05); *G02B 2027/0138* (2013.01); *G02B 2027/0154* (2013.01)

(56) References Cited

U.S. PATENT DOCUMENTS

| | | | |
|---|---|---|---|
| 10,338,386 | B2 | 7/2019 | Ling et al. |
| 2016/0070102 | A1* | 3/2016 | Takamatsu ......... G02B 27/0101 359/631 |
| 2016/0243984 | A1 | 8/2016 | Aoki |
| 2019/0164463 | A1* | 5/2019 | Shim ........................ G09G 5/38 |
| 2020/0338987 | A1* | 10/2020 | Ichikawa ............. G02B 7/1821 |
| 2020/0379252 | A1* | 12/2020 | Kuzuhara .......... G02B 27/0025 |

FOREIGN PATENT DOCUMENTS

| | | |
|---|---|---|
| CN | 105785569 A | 7/2016 |
| CN | 106019595 A | 10/2016 |
| CN | 106125306 A | 11/2016 |
| CN | 106461948 A | 2/2017 |
| CN | 206096620 U | 4/2017 |
| CN | 106740116 A | 5/2017 |
| CN | 106873156 A | 6/2017 |
| CN | 206421102 U | 8/2017 |
| CN | 107272194 A | 10/2017 |
| CN | 108508607 A | 9/2018 |
| EP | 3190446 A3 | 1/2018 |

\* cited by examiner

VEHICLE-MOUNTED DISPLAY DEVICE AND DISPLAY SYSTEM

CROSS-REFERENCE TO RELATED APPLICATIONS

The application claims priority of the Chinese patent application No. 201810295574.4 filed on Mar. 30, 2018, the entire disclosure of which is incorporated herein by reference as part of the present application.

FIELD OF TECHNOLOGY

Embodiments of the present disclosure relate to a vehicle-mounted display device and a display system.

BACKGROUND

Currently, vehicles bring great convenience to daily life. During driving, the user needs to look down at a dashboard, which is disadvantage to driving safety. To this end, there is a need for the user driving the vehicle to display information on the dashboard or other information at the windshield position, so that the user driving the vehicle can view various information without looking down. However, an existing head up display (HUD) requires an additional display screen, which affects the viewing effect to the user driving the vehicle. In addition, the existing HUD device is large in size and occupies a large space in the vehicle.

SUMMARY

Embodiments of the present disclosure provide a vehicle-mounted display device and a display system.

At least one embodiment of the present disclosure provides a vehicle-mounted display device, which includes: an image source, a light reflection module, and an image size adjustment module that are located on an optical path; the image source is configured to emit image light to the light reflection module according to an image to be displayed; the image light is reflected at least twice by the light reflection module, and exits towards the image size adjustment module; and the image size adjustment module is configured to adjust the image light incident thereon and to emit the image light upon being adjusted.

In one or more embodiments of the present disclosure, the light reflection module includes a first reflection surface and a second reflection surface, and the image light is reflected by the first reflection surface for a first time and is reflected by the second reflection surface for a second time to form a reflected light, and the image light is intersected with the reflected light.

In one or more embodiments of the present disclosure, the light reflection module includes a pentaprism, the pentaprism includes an incident surface and an exit surface, the image light is incident onto the incident surface and exits from the exit surface, and the exit surface is adjacent to the incident surface and is located between the incident surface and the image size adjustment module.

In one or more embodiments of the present disclosure, the first reflection surface is adjacent to the exit surface, the second reflection surface is adjacent to the incident surface, and the incident surface is perpendicular to the exit surface.

In one or more embodiments of the present disclosure, the pentaprism includes a first side surface, a second side surface, a third side surface, a fourth side surface, and a fifth side surface that are adjacent to one another sequentially, and the fifth side surface is adjacent to the first side surface, the first side surface is the incident surface, the second side surface is the second reflection surface, the fourth side surface is the first reflection surface, and the fifth side surface is the exit surface.

In one or more embodiments of the present disclosure, the light reflection module includes a first reflection mirror and a second reflection mirror; the first reflection mirror is arranged between the second reflection mirror and the image size adjustment module; the image light is reflected by the first reflection mirror for a first time and is reflected by the second reflection mirror for a second time, and the image light upon being reflected for the second time exits to the image size adjustment module.

In one or more embodiments of the present disclosure, the light reflection module is arranged between the image size adjustment module and the image source.

In one or more embodiments of the present disclosure, the image size adjustment module is configured to converge or diverge the image light.

In one or more embodiments of the present disclosure, the vehicle-mounted display device further includes a first fixing component and a first adjusting component; the first fixing component is configured to fix the light reflection module; the first adjusting component is connected with the first fixing component and is configured to drive the first fixing component to rotate to cause the light reflection module to rotate, so as to adjust a light exit direction of the light reflection module.

In one or more embodiments of the present disclosure, the vehicle-mounted display device further includes a second fixing component and a second adjusting component; the second fixing component is configured to fix the image source; the second adjusting components is connected with the second fixing component and is configured to drive the second fixing component to rotate to cause the image source to rotate, so as to adjust a light exit direction of the image source.

In one or more embodiments of the present disclosure, the vehicle-mounted display device further includes a camera module, a processing module, and a display module; the processing module is electrically connected with the camera module and the display module, respectively; the camera module is configured to acquire an image in a predetermined range and send the image to the processing module; the predetermined range includes a user using the vehicle-mounted display device; the processing module is configured to determine a height of the user according to the image, and is configured to obtain, by calculating, a rotating angle of an exit optical axis of at least one selected from the group consisting of the light reflection module and the image source based on the height of the user and a height of a virtual image; and the display module is configured to display the rotating angle.

In one or more embodiments of the present disclosure, the vehicle-mounted display device further includes an automatic adjustment module; the automatic adjustment module is electrically connected with the processing module, is connected with at least one selected from the group consisting of the light reflection module and the image source, and is configured to adjust a direction of an exit optical axis of at least one selected from the group consisting of the light reflection module and the image source according to the rotating angle.

In one or more embodiments of the present disclosure, the image size adjustment module includes an aspherical reflection mirror or a concave lens.

At least one embodiment of the present disclosure further provides a display system, which includes a reflective element and any one of the vehicle-mounted display devices as described above; the image light emitted from the image size adjustment module is reflected by the reflective element to form a virtual image of the image to be displayed.

In one or more embodiments of the present disclosure, the reflective element includes a windshield of a vehicle.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. The terms "on," "under," "right," "left" and the like are only used to indicate relative position relationship, and when the position of the described object is changed, the relative position relationship may be changed accordingly.

Figure 1:
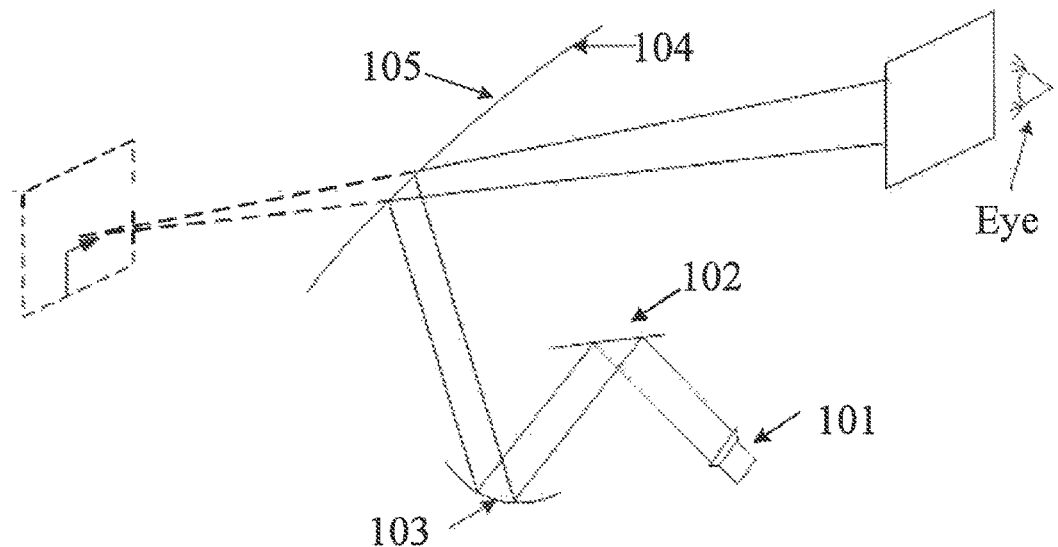
FIG. 1 is a schematic structural diagram illustrating a vehicle-mounted display device.

Referring to FIG. 1, a conventional head up display (HUD) device includes an image source 101, a reflection mirror 102, a spherical mirror 103, and a display screen 104. The image source 101 emits image light (multiple light rays) according to the image to be displayed. The image light is reflected by the reflection mirror 102 and exits to the spherical mirror 103 and finally is reflected by the spherical mirror 103 and exits to the display screen 104 on the windshield 10 of the vehicle. Due to the optical characteristics of the reflection mirror (that is, an incident angle is equal to an exit angle), it is necessary to ensure that the light emitted from the image source 101 has a certain incident angle with respect to the reflection mirror 102. Therefore, the spherical mirror 103 is required to be disposed at a position in an exit direction of the light that is reflected by the reflection mirror 102. In this case, a distance between the image source 101 and the spherical mirror 103 is large, resulting in a large volume of the HUD. In addition, the display screen 104 of the HUD device is required to be attached to the windshield, which affects the vision field of a user.

Figure 2:
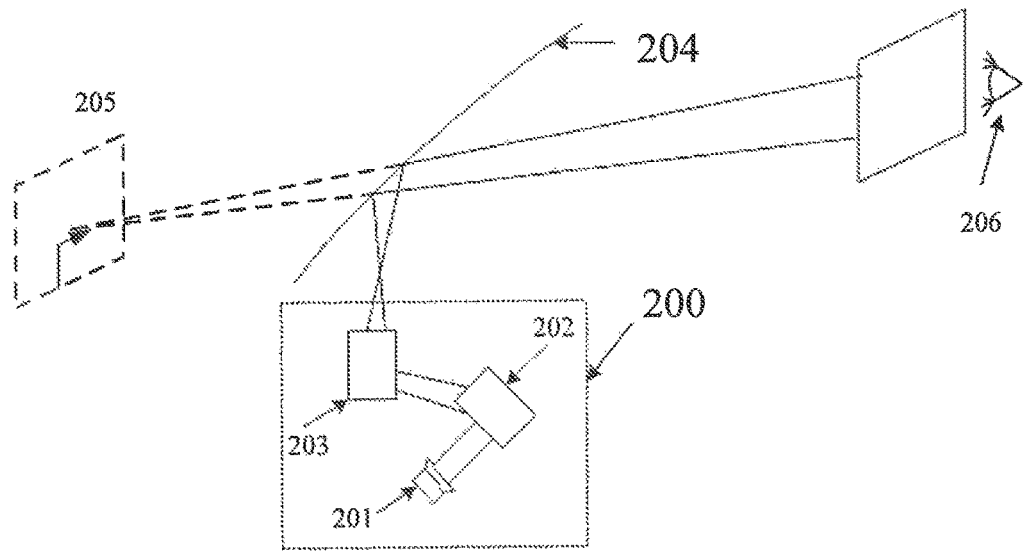
FIG. 2 is a schematic structural diagram illustrating a vehicle-mounted display device and a display system provided by an embodiment of the present disclosure.

FIG. 2 is a schematic structural diagram illustrating a vehicle-mounted display device and a display system provided by an embodiment of the present disclosure. It should be understood that, the vehicle-mounted display device provided by this embodiment can be fixed at a predetermined position of the vehicle when used, and light emitted from the vehicle-mounted display device is projected to a predetermined region of the windshield of the vehicle. The predetermined position and the predetermined region can be designed according to specific requirements, which is not limited in the embodiments of the present disclosure.

Referring to FIG. 2, the vehicle-mounted display device 200 includes: an image source 201, a light reflection module 202, and an image size adjustment module 203 that are located on an optical path. The image source 201 is configured to emit image light (multiple light rays) to the light reflection module 202 according to an image to be displayed; the image light is reflected at least twice by the light reflection module 202 and exits to the image size adjustment module 203; the image light is adjusted by the image size adjustment module 202 and exits towards the windshield 204.

In the vehicle-mounted display device according to the embodiment of the present disclosure, the image light is reflected at least twice by the light reflection module 202, which can effectively shorten the optical path and reduce the volume of the vehicle-mounted display device.

The windshield 204 can reflect the image light exiting from the image size adjustment module 202 to form a virtual image of the image to be displayed. The windshield 204 serves as a reflective element, and the vehicle-mounted display device 200 and the reflective element can constitute a display system.

In an embodiment, the image source 201 may be a micro liquid crystal display (LCD), a liquid crystal on silicon (LCOS) device, a digital light processing (DLP) component, a laser micro-electro-mechanical system (MEMS), or a projector, etc., without limited thereto, as long as the image source 201 in the embodiment of the present disclosure can generate image light.

In an embodiment, the light reflection module 202 may be a pentaprism, or a combination of a first reflection mirror and a second reflection mirror.

In an embodiment, the image size adjustment module 203 may be an aspherical mirror or a concave lens, without limited thereto, and may be selected as needed. In the case where a size of the image to be displayed is required to be enlarged, the aspherical mirror can be used. In the case where a size of the image to be displayed is required to be reduced, the concave lens can be used. Of course, the vehicle-mounted display device may also be provided with both of the aspherical mirror and the concave lens, and the user can select the aspherical mirror and the concave lens by means of rotation switching, so that the size of the image to be displayed is suitable for the requirements of the user. The structure of the image size adjustment module may be selected according to specific requirements, without limited herein.

Therefore, the light reflection module 202 is provided in the embodiment of the present disclosure to reflect the image light emitted from the image source 201 at least twice, so that an included angle formed between an incident optical axis and an exit optical axis of the light reflection module 202 can be adjusted. In this way, a distance between the image source 201 and the image size adjustment module 203 can be reduced, which is beneficial to reducing a volume of the vehicle-mounted display device. Moreover, in the display system provided by an embodiment of the present disclosure, the light exiting from the vehicle-mounted display device is directly incident onto the windshield 204, and enters eyes of the user upon being reflected by the windshield 204, so that a virtual image of the image to be displayed can be observed by the user. In this way, a display screen can be omitted so as not to affect sight line of the user, thereby further reducing a volume of the vehicle-mounted display device. For example, the optical axis refers to a center line of a light beam (light column), or a symmetry axis of an optical element. A virtual image 205 and a user 206 are also illustrated in FIG. 2. For example, the virtual image 205 can display driving-related information, such as a speed limit 60 and the like.

Figure 3:
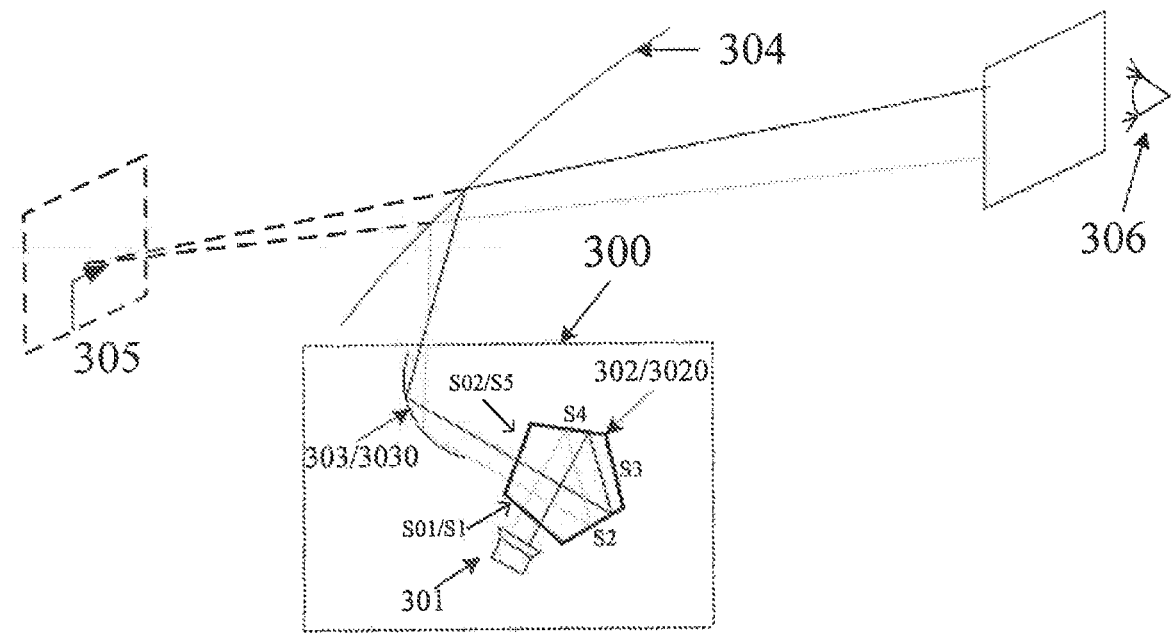
FIG. 3 is a schematic structural diagram illustrating a vehicle-mounted display device and a display system that include a pentaprism and an aspherical mirror provided by an embodiment of the present disclosure.

FIG. 3 is a schematic structural diagram illustrating a vehicle-mounted display device 300 and a display system provided by an embodiment of the present disclosure.

Referring to FIG. 3, the vehicle-mounted display device 300 includes an image source 301, a light reflection module 302, and an image size adjustment module 303 that are located on an optical path. The embodiment illustrated in FIG. 3 is described with reference to the case where the light reflection module 302 is a pentaprism 3020 and the image size adjustment module 303 is an aspherical mirror 3030, by way of example.

As illustrated in FIG. 3, the image source 301 emits image light (multiple light rays) to the pentaprism 3020 according to the image to be displayed. The pentaprism 3020 is configured to reflect the image light twice to cause the image light to exit to the aspherical mirror 3030. The aspherical mirror 3030 is configured to adjust the image light to cause the image light to exit towards the windshield serving as the reflective element 304 to increase a size of the image to be displayed. Referring to FIG. 3, the display system includes a vehicle-mounted display device 300 and a reflective element 304. The reflective element 304 is the windshield, and the windshield reflects the image light to form a virtual image 305 of the image to be displayed. The user 306 can obtain the display information of the vehicle-mounted display device 300 by the virtual image 305.

Still referring to FIG. 3, the below is described with reference to the case where an optical path with two light rays at borders thereof that are illustrated by a black line and a grey line respectively, by way of example. The image source 301 emits two light rays to the pentaprism 3020 according to the image to be displayed. As illustrated in FIG. 3, the pentaprism 3020 includes a first side surface S1, a second side surface S2, a third side surface S3, a fourth side surface S4, and a fifth side surface S5, which are sequentially arranged, and the first side surface S1 is connected with the fifth side surface S5. The first side surface S1 of the pentaprism 3020 is an incident surface S01 of the light rays. The two light rays enter an interior of the pentaprism 3020 from the first side surface S1, reach the fourth side surface S4 of the pentaprism 3020, and reach the second side surface S2 upon being reflected by the fourth side surface S4, and reach the fifth side surface S5 (i.e., the exit surface S02) upon being reflected by the second side surface S2, and finally exit to the aspherical mirror 3030. The optical path of other light rays can be made reference to the optical path of the two light rays. The aspherical mirror 3030 reflects multiple light rays to the windshield 304. In this embodiment, for each light ray, the aspherical mirror 3030 reflects each light ray, and for the multiple light rays as a whole, the aspherical mirror scatters the multiple light rays. In other words, the aspherical mirror may have different curvatures in different regions. In this embodiment, by adjusting the curvature of each of the regions of the aspherical mirror, directions and positions of the multiple light rays that reach the windshield can be adjusted to adjust a size of the virtual image observed by the user.

In an embodiment, the first side surface S1 (incident surface S01) and the fifth side surface S5 (exit surface S02) of the pentaprism 3020 are perpendicular to each other, so that in the case where the multiple light rays emitted from the image source 301 are dispersed, the multiple light rays are consistent to prevent distortion of the virtual image of the image to be displayed.

Therefore, the pentaprism of the embodiment is employed to reflect the incident light twice, so that an included angle formed between the incident light and the exit light of the pentaprism is no limited by the characteristics of a reflection mirror, which is beneficial to reducing a distance between the image source 301 and the aspherical mirror 3030, thereby reducing a volume of the vehicle-mounted display device.

The inventor(s) found that in practical applications, a height of each user is different. If a projection region of the vehicle-mounted display device projected on the windshield is not flush with the user's eyes, the effect of the user observing the image to be displayed will be greatly decreased. For example, flushing with the user's eyes may be that an included angle of a line connecting the eyes with the projection region with respect to a horizontal line is from −5 to +5 degrees. If the included angle is in other degrees, it is the case of not flushing with the user's eyes, without limited thereto.

Figure 4A:
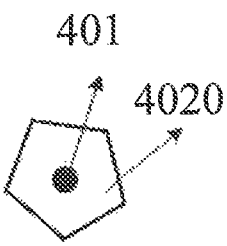
FIG. 4A is a schematic structural diagram illustrating a vehicle-mounted display device including a first fixing component provided by an embodiment of the present disclosure.

FIG. 4A is a schematic structural diagram illustrating a vehicle-mounted display device including a first fixing component, provided by an embodiment of the present disclosure. As illustrated in FIG. 4A, the vehicle-mounted display device includes a pentaprism 4020 and a first fixing component 401.

Figure 4B:
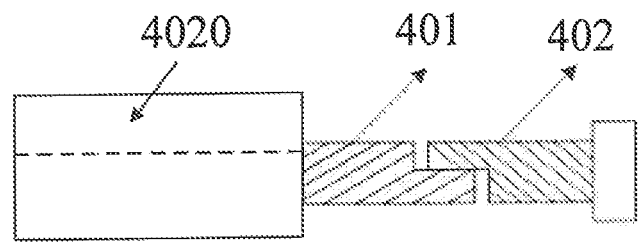
FIG. 4B is a schematic structural diagram illustrating a vehicle-mounted display device including a first fixing component and a first adjusting component provided by an embodiment of the present disclosure.

FIG. 4B is a schematic structural diagram illustrating a vehicle-mounted display device including a first fixing component and a first adjusting component, provided by an embodiment of the present disclosure. The structure illustrated in FIG. 4B is different from the structure illustrated in FIG. 4A in viewing angle.

In order to improve the effect of the user observing the image to be displayed, in an embodiment, as illustrated in FIG. 4B, the vehicle-mounted display device includes a pentaprism 4020, a first fixing component 401, and a first adjusting component 402. The image source and the image size adjustment module of the vehicle-mounted display device are not illustrated in FIG. 4B, and can be made reference to the description of other embodiments.

For example, the first fixing component 401 may include two fixing ends, the two fixing ends are fixed on two side surfaces corresponding to an axis of the pentaprism, respectively; and the two fixing ends can be rotatable fixed on the vehicle-mounted display device, without limited thereto. For example, the first fixing component 401 may include a fixing end fixed on a side surface corresponding to the axis of the pentaprism. For example, the side surface corresponding to the axis of the pentaprism is a side surface that is in contact with all five side surfaces S1-S5 of the pentaprism. The two side surfaces corresponding to the axis of the pentaprism are opposite to each other. For example, the side surfaces corresponding to the axis of the pentaprism is the side surfaces through which the axis (center line) of the pentaprism passes.

The first adjusting component 402 may be connected with the first fixing component 401 in a connection manner of snap-fitting, buckling, riveting, etc., without limited thereto. The embodiment illustrated in FIG. 4B is described with reference to the case where the first adjusting component is connected with the first fixing component with a buckle, by way of example.

When the user rotates the first adjusting component 402, the first adjusting component 402 can drive the first fixing component 401 to rotate, so that the pentaprism can rotate around its axis. In this way, in this embodiment, the pentaprism is movably fixed in the vehicle-mounted display device by the first fixing component 401 to adjust a direction of an exit optical axis of the pentaprism (that is, the light reflection module), and finally to adjust the height of the virtual image.

Figure 5A:
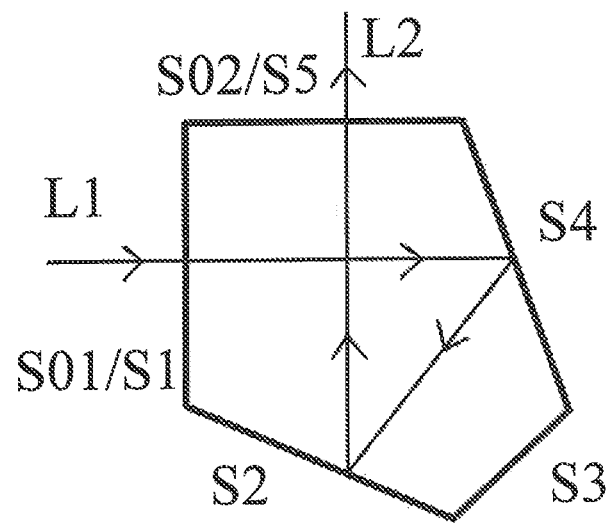
FIG. 5A is an optical path diagram illustrating an exit optical axis of a pentaprism, before adjusting, of a vehicle-mounted display device provided by an embodiment of the present disclosure.
Figure 5B:
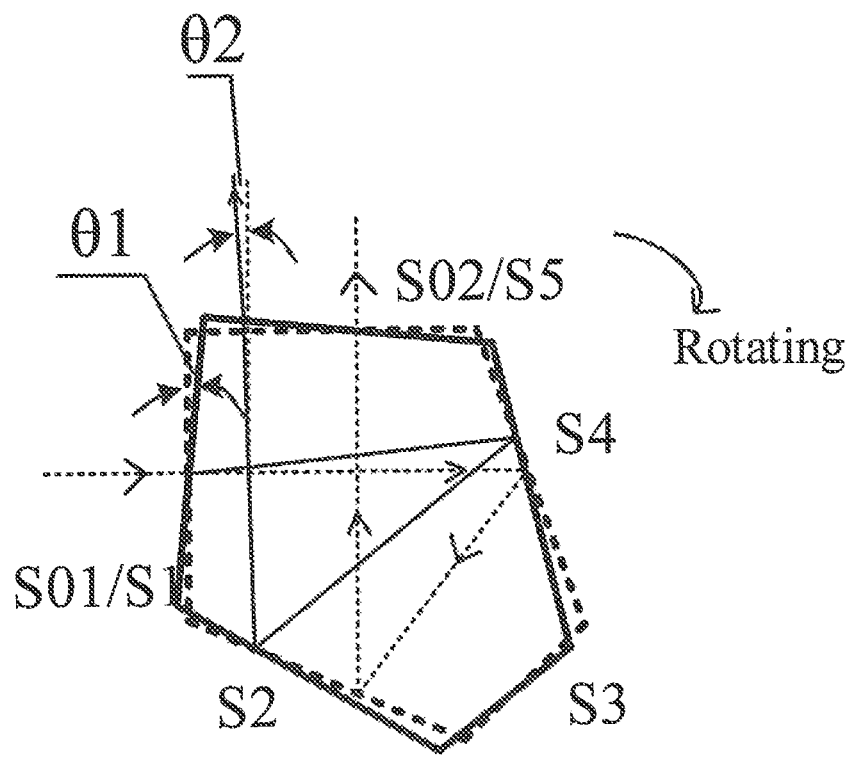
FIG. 5B is an optical path diagram illustrating an exit optical axis of a pentaprism, before and after adjusting, of a vehicle-mounted display device provided by an embodiment of the present disclosure.

FIG. 5A is an optical path diagram illustrating an exit optical axis of a pentaprism, before adjusting, of a vehicle-mounted display device provided by an embodiment of the present disclosure, and FIG. 5B is an optical path diagram illustrating an exit optical axis of a pentaprism, before and after adjusting, of a vehicle-mounted display device provided by an embodiment of the present disclosure.

Referring to FIG. 5A, a light ray is incident through the first side surface S1 (incident surface S01) of the pentaprism, and is reflected by the fourth side surface S4 and the second side surface S2, respectively, and finally exits from the fifth side surface S5 (exit surface S02). The incident surface S01 is perpendicular to the exit surface S02. For convenience of explanation, in this embodiment, the incident light ray is perpendicular to the first side surface S1, and the first side surface S1 is perpendicular to the fifth side surface S5. In this case, an included angle formed between the incident light ray L1 and the exit light ray L2 is 90 degrees, and an angle between the incident light ray and the first the side surface S1 can be adjusted according to the specific requirements.

Referring to FIG. 5B, the pentaprism is rotated clockwise by an angle $\theta 1$. For example, the angle $\theta 1$ is 2 degrees, without limited thereto. Due to the refraction of the pentaprism, the light ray enters the pentaprism and reaches the fourth side surface S4, and a reflection point of the light ray on the fourth side surface S4 moves upward, that is, the included angle (acute angle) formed between the light ray and the fourth side surface S4 becomes larger, and the incident angle of the light ray incident on the fourth side surface S4 becomes smaller. The light ray reflected by the fourth side surface S4 reaches a reflection point on the second side surface S2, and the reflection point on the second side surface S2 moves left than before, that is, the included angle (acute angle) formed between the light ray and the second side surface S2 becomes smaller, and the incident angle of the light ray incident on the second side surface S2 becomes smaller. Finally, the light ray reaching the fifth side surface S5 forms an included angle with the fifth side surface S5, and in combination with the refraction of the pentaprism, the exit light ray upon being adjusted is rotated counterclockwise by an angle $\theta 2$ with respect to the exit light ray before adjusting, for example, the angle $\theta 2$ is 5 degrees, without limited thereto. In FIG. 5B, the dotted lines refer to the position and optical path of the pentaprism before rotating, respectively; and the solid lines refer to the position and optical path of the pentaprism after rotating, respectively.

Figure 6:
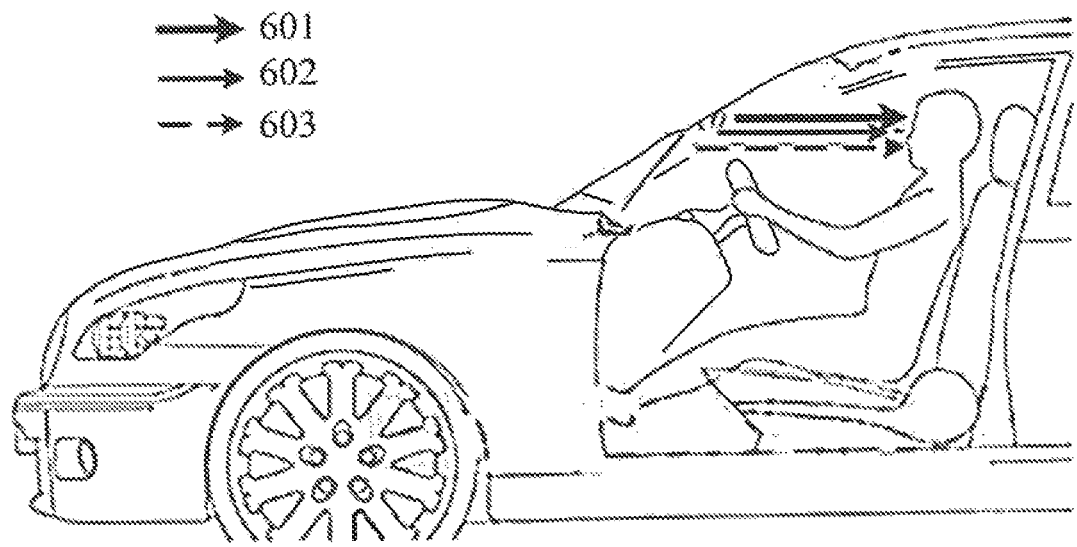
FIG. 6 is a schematic diagram illustrating adjusting a position of a projection region provided by an embodiment of the present disclosure.

FIG. 6 is a schematic diagram illustrating adjusting a position of a projection region provided by an embodiment of the present disclosure. In FIG. 6, a reference numeral 601 refers to a first position, which can correspond to a user with a higher height, a reference numeral 602 refers to a second position, which can correspond to a user with a normal height, and a reference numeral 603 refers to a third position, which can correspond to a user with a shorter height.

Still referring to FIG. 3, the exit light ray is counterclockwise rotated, so that a reflection point on the aspherical mirror moves downward (the up, down, left, and right sides of FIG. 3 is illustrated as an example), and a reflection point of the light ray upon being reflected by the aspherical mirror on the windshield moves downward, that is, a position of the projection region on the windshield moves downward. In this way, the user with a shorter height can be flush with the projection region as illustrated in FIG. 6 (illustrated by the dotted line). Therefore, in this embodiment, the position of the projection region of the vehicle-mounted display device on the windshield can be adjusted by the first adjusting component 402, so as to satisfy the requirement of the user with a short height.

Still referring to FIG. 3 to FIG. 6 if the first adjusting component adjusts the pentaprism to rotate counterclockwise, the position of the projection region on the windshield will moves upward, so that the user with a higher height can be flush with the projection region as illustrated in FIG. 6 (illustrated by the thick solid line), to satisfy the requirement of the user with a higher height. The vehicle-mounted display device provided by the embodiments of the present disclosure can change the projection position of the image light on the windshield by rotating the pentaprism to satisfy the requirement of the users with different heights.

Figure 7:
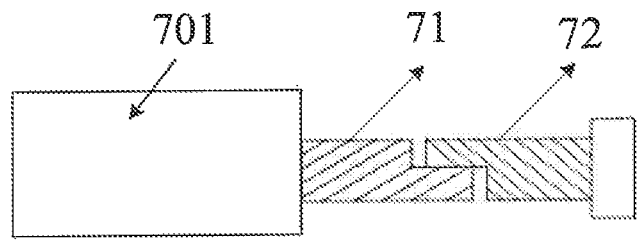
FIG. 7 is a schematic structural diagram illustrating a vehicle-mounted display device including a second fixing component and a second adjusting component provided by an embodiment of the present disclosure.

FIG. 7 is a schematic structural diagram illustrating a vehicle-mounted display device including a second fixing component and a second adjusting component provided by an embodiment of the present disclosure. In an embodiment, the vehicle-mounted display device includes an image source 701, a second fixing component 71, and a second adjusting component 72. The second fixing component 71 is configured to movably mount the image source 701 in the vehicle-mounted display device, and the second adjusting component 72 is connected with the second fixing component 71. The user can operate the second adjusting component 72 as needed. In this way, the second adjusting component 72 can drive the second fixing component 71 to rotate so as to adjust a direction of the exit optical axis of the image source 701.

The second adjusting component 72 may be connected with the second fixing component 71 in a connection manner of snap-fitting, buckling, riveting, etc., without limited thereto. For example, the second fixing component 71 may be fixed on a non-light-exit side of the image source 701.

Still referring to FIGS. 5A and 5B, before adjusting, the exit optical axis of the image source is perpendicular to the first side surface S1 of the pentaprism, so that the included angle formed between the exit optical axis and the incident optical axis of the pentaprism can be 90 degrees. When the user operates the second adjusting component, the exit optical axis of the image source is rotated counterclockwise by 2 degrees, that is, the included angle (acute angle) formed between the light ray and the fourth side surface S4 of the pentaprism becomes larger, and the included angle (acute angle) formed between the light ray upon being reflected by the fourth side surface S4 and the second side surface S2 becomes smaller. Finally, the light ray reflected by the second side surface S2 is not perpendicular to the fifth side surface S5, that is, the light ray has an included angle with a normal line of the fifth side surface S5, and in combination with the refraction of the pentaprism, an included angle formed between the exit light ray after adjusting and the exit light ray before adjusting is up to 5 degrees. The reflection points of the light ray on the aspherical mirror and the windshield move downward respectively, that is, the projection region of the vehicle-mounted display device on the windshield moves downward, so that the user with a shorter height can observe the virtual image. The projection region can move upward by rotating the exit optical axis of the image source clockwise, without repeated herein.

Therefore, the second fixing component and the second adjusting component are arranged in the embodiment, the position of the projection region of the vehicle-mounted display device on the windshield is adjusted by adjusting the direction of the exit optical axis of the image source, so as to satisfy the observing requirement of the users with different heights.

Figure 8A:
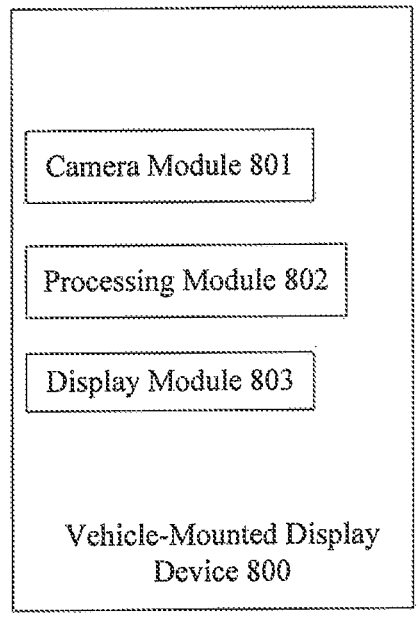
FIG. 8A is a schematic structural diagram illustrating a vehicle-mounted display device provided by an embodiment of the present disclosure.

FIG. 8A is a schematic structural diagram illustrating a vehicle-mounted display device provided by an embodiment of the present disclosure. In an embodiment, the vehicle-mounted display device 800 may further include a camera module 801, a processing module 802, and a display module 803. The processing module 802 is electrically connected with the camera module 801 and the display module 803, respectively.

The camera module 801 may be fixed on a dashboard of the vehicle, and configured to acquire an image in a predetermined range in the vehicle and send the image to the processing module 802. It should be understood that the predetermined range includes a user observing the virtual image of the image to be displayed, for example, the predetermined range may include a seat of a driver.

The processing module 802 is configured to determine a height of the user according to the image, and to obtain, by calculating, a rotating angle of the exit optical axis of the light reflection module based on the height of the user and a height of the virtual image.

The display module 803 is configured to display the rotating angle.

In the case where an angular scale is provided on the first adjusting component 402 (or the second adjusting component 72), the user can change the rotating angle by operating the first adjusting component 402 (or the second adjusting component 72) according to the rotating angle displayed by the display module, so as to quickly adjust the position of the projection region of the vehicle-mounted display device on the windshield.

Figure 8B:
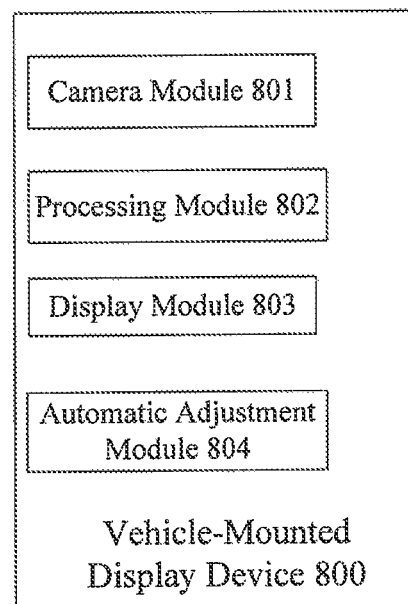
FIG. 8B is a schematic structural diagram illustrating a vehicle-mounted display device provided by an embodiment of the present disclosure.

FIG. 8B is a schematic structural diagram illustrating a vehicle-mounted display device provided by an embodiment of the present disclosure. In an embodiment, the vehicle-mounted display device may further include an automatic adjustment module 804. The automatic adjustment module 804 is electrically connected with the processing module 802 and is connected with the light reflection module 302. The processing module 802 obtains the rotating angle by calculating, and sends the rotating angle to the automatic adjustment module 804. The automatic adjustment module 804 can rotate the first adjusting component 402 (or the second adjusting component 72) according to the rotating angle, so as to rapidly adjust the position of the projection region of the vehicle-mounted display device on the windshield.

It should be understood that the above-mentioned automatic adjustment module can be implemented by using a stepping motor in the related technology. The control method and control circuit of the stepping motor can be referred to related technologies, which will not be described in detail here.

Therefore, in the embodiment, the position of the projection region can be adjusted after the user enters the predetermined range without manual adjusting by the user, thereby improving the user experience.

Figure 9:
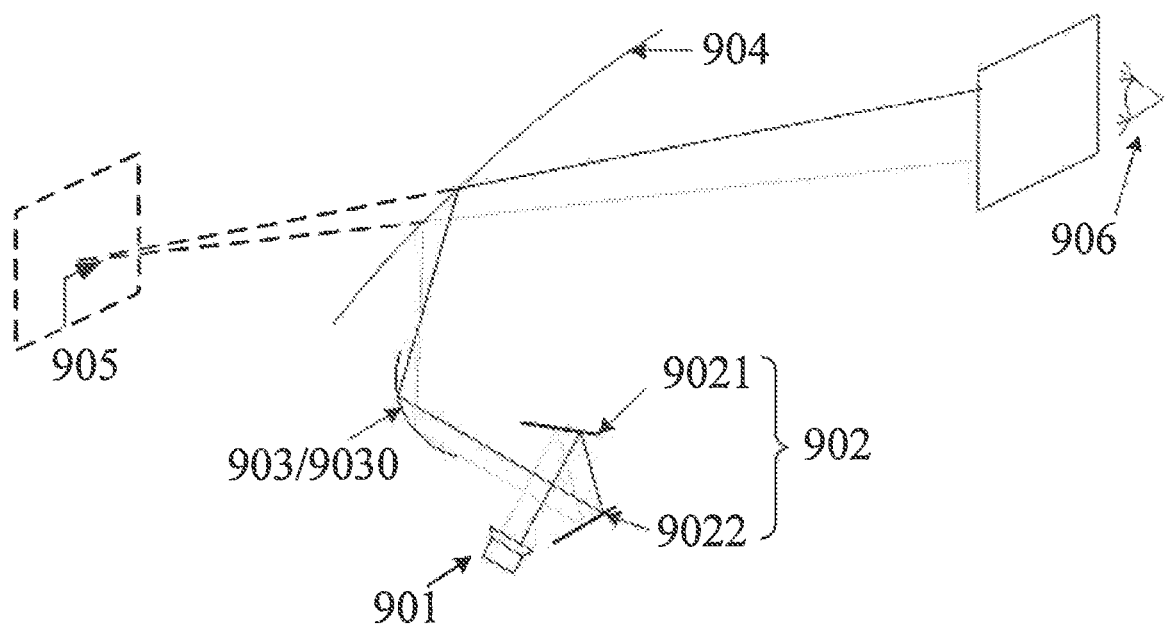
FIG. 9 is a schematic structural diagram illustrating a vehicle-mounted display device including a first reflection mirror, a second reflection mirror, and an aspheric mirror provided by an embodiment of the present disclosure.

FIG. 9 is a schematic structural diagram illustrating a vehicle-mounted display device and a display system provided by an embodiment of the present disclosure. Referring to FIG. 9, the vehicle-mounted display device 900 includes: an image source 901, a light reflection module 902, and an image size adjustment module 903 located on an optical path. The light reflection module 902 may be a first reflection mirror 9021 and a second reflection mirror 9022, and the image size adjustment module 903 may be an aspherical mirror 9030.

The image source 901 is configured to emit image light (multiple light rays) to a pentaprism according to an image to be displayed. The image light is reflected twice by the first reflection mirror 9021 and the second reflection mirror 9022 and exits to the aspherical mirror 9030. The aspherical mirror 9030 is configured to adjust a direction in which the multiple light rays exits towards the windshield, to increase a size of the image to be displayed. The display system includes the vehicle-mounted display device 900 and the windshield serving as a reflective element 904. The image light exits to the windshield by the aspherical mirror, and is reflected by the windshield to form a virtual image 905 of the image to be displayed. A user 906 is also illustrated in FIG. 9.

It should be explained that, positions where the first reflection mirror 9021 and the second reflection mirror 9022 are mounted can be referenced to the positions of the fourth side surface S4 and the second side surface S2 of the pentaprism, respectively.

Still referring to FIG. 9, the below is described with the case where an optical path has two light rays at borders thereof represented by a black line and a grey line respectively is illustrated, by way of example. The image source 901 emits two light rays to the first reflection mirror 9021 according to the image to be displayed. The two light rays exit to the second reflection mirror 9022 upon being reflected by the first reflection mirror 9021, respectively, and exit to the aspherical mirror 9030 upon being reflected by the second reflection mirror 9022, and exit to the windshield upon being adjusted by the aspherical mirror 9030. Optical paths of other light rays can be referred to the optical path of the above mentioned two light rays. In this embodiment, for each of the light rays, the aspherical mirror reflects the light ray, and for multiple light rays as a whole, the aspherical mirror scatters the multiple light rays. In other words, in this embodiment, the aspherical mirror may have different curvatures at different regions, by adjusting the curvature of each of the regions of the aspherical mirror, directions and positions of the multiple light rays that reach the windshield can be adjusted to adjust a size of the virtual image observed by the user.

It should be understood that, on the basis of the vehicle-mounted display device illustrated in FIG. 9 and in the absence of conflict between respective components, one or more selected from the group consisting of the camera module, the processing module, the display module, the first fixing component, the first adjusting component, the automatic adjustment module, the second fixing component and the second adjusting component can be added to the vehicle-mounted display device illustrated in FIG. 9 to form different solutions. The operating principle of each of the components, can be referred to the description of related content to the vehicle-mounted display device illustrated in FIG. 2 to FIG. 6, without repeated herein.

Furthermore, the embodiments of the present disclosure and the features therein can be combined with each other in the absence of conflict.

The above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A vehicle-mounted display device, comprising: an image source, a light reflection module, and an image size adjustment module that are located on an optical path, wherein the image source is configured to emit image light to the light reflection module according to an image to be displayed;

the image light is reflected at least twice by the light reflection module, and exits towards the image size adjustment module; and the image size adjustment module is configured to adjust the image light incident thereon and to emit the image light upon being adjusted, the light reflection module comprises a pentaprism, the pentaprism comprises a first side surface, a second side surface, a third side surface, a fourth side surface, and a fifth side surface that are adjacent to one another sequentially, the vehicle-mounted display device further comprises a first fixing component and a first adjusting component, wherein the first fixing component is configured to fix the light reflection module; the first adjusting component is connected with the first fixing component and is configured to drive the first fixing component to rotate to cause the light reflection module to rotate, so as to adjust a light exit direction of the light reflection module, the pentaprism further comprises a face surface corresponding to the axis of the pentaprism, and the face surface is in contact with the first side surface, the second side surface, the third side surface, the fourth side surface, and the fifth side surface, respectively, and the first fixing component comprises a fixing end fixed on the face surface of the pentaprism.

2. The vehicle-mounted display device according to claim 1, wherein the light reflection module comprises a first reflection surface and a second reflection surface, and the image light is reflected by the first reflection surface for a first time and is reflected by the second reflection surface for a second time to form a reflected light, and the image light is intersected with the reflected light.

3. The vehicle-mounted display device according to claim 2, wherein the pentaprism comprises an incident surface and an exit surface, the image light is incident onto the incident surface and exits from the exit surface, and the exit surface is adjacent to the incident surface and is located between the incident surface and the image size adjustment module.

4. The vehicle-mounted display device according to claim 3, wherein the first reflection surface is adjacent to the exit surface, the second reflection surface is adjacent to the incident surface, and the incident surface is perpendicular to the exit surface.

5. The vehicle-mounted display device according to claim 4, wherein the fifth side surface is adjacent to the first side surface, the first side surface is the incident surface, the second side surface is the second reflection surface, the fourth side surface is the first reflection surface, and the fifth side surface is the exit surface.

6. The vehicle-mounted display device according to claim 2, wherein the image size adjustment module comprises an aspherical reflection mirror or a concave lens.

7. The vehicle-mounted display device according to claim 1, wherein the light reflection module is arranged between the image size adjustment module and the image source.

8. The vehicle-mounted display device according to claim 1, wherein the image size adjustment module is configured to converge or diverge the image light.

9. The vehicle-mounted display device according to claim 1, further comprising a second fixing component and a second adjusting component, wherein the second fixing component is configured to fix the image source; the second adjusting components is connected with the second fixing component and is configured to drive the second fixing component to rotate to cause the image source to rotate, so as to adjust a light exit direction of the image source.

10. The vehicle-mounted display device according to claim 1, further comprising a camera module, a processing module, and a display module, wherein the processing module is electrically connected with the camera module and the display module, respectively;

the camera module is configured to acquire an image in a predetermined range and send the image to the processing module, the predetermined range comprises a user using the vehicle-mounted display device;

the processing module is configured to determine a height of the user according to the image, and is configured to obtain, by calculating, a rotating angle of an exit optical axis of at least one selected from the group consisting of the light reflection module and the image source based on the height of the user and a height of a virtual image; and the display module is configured to display the rotating angle.

11. The vehicle-mounted display device according to claim 10, further comprising an automatic adjustment module, wherein the automatic adjustment module is electrically connected with the processing module, is connected with at least one selected from the group consisting of the light reflection module and the image source, and is configured to adjust a direction of an exit optical axis of at least one selected from the group consisting of the light reflection module and the image source according to the rotating angle.

12. The vehicle-mounted display device according to claim 1, wherein the image size adjustment module comprises an aspherical reflection mirror or a concave lens.

13. A display system comprising a reflective element and the vehicle-mounted display device according to claim 1, wherein the image light emitted from the image size adjustment module is reflected by the reflective element to form a virtual image of the image to be displayed.

14. The display system according to claim 13, wherein the reflective element comprises a windshield of a vehicle.

15. The vehicle-mounted display device according to claim 1, further comprising a second fixing component and a second adjusting component, wherein the second fixing component is configured to fix the image source; the second adjusting component is connected with the second fixing component and is configured to drive the second fixing component to rotate to cause the image source to rotate, so as to adjust a light exit direction of the image source.

16. The vehicle-mounted display device according to claim 15, further comprising a camera module, a processing module, and a display module, wherein the processing module is electrically connected with the camera module and the display module, respectively;

the camera module is configured to acquire an image in a predetermined range and send the image to the processing module; the predetermined range comprises a user using the vehicle-mounted display device;

the processing module is configured to determine a height of the user according to the image, and is configured to obtain, by calculating, a rotating angle of an exit optical axis of at least one selected from the group consisting of the light reflection module and the image source based on the height of the user and a height of a virtual image; and the display module is configured to display the rotating angle.

17. The vehicle-mounted display device according to claim 16, further comprising an automatic adjustment module, wherein the automatic adjustment module is electrically connected with the processing module, is connected with at least one selected from the group consisting of the light reflection module and the image source, and is configured to adjust a direction of an exit optical axis of at least one selected from the group consisting of the light reflection module and the image source according to the rotating angle.

* * * * *